United States Patent Office 3,434,515
Patented Mar. 25, 1969

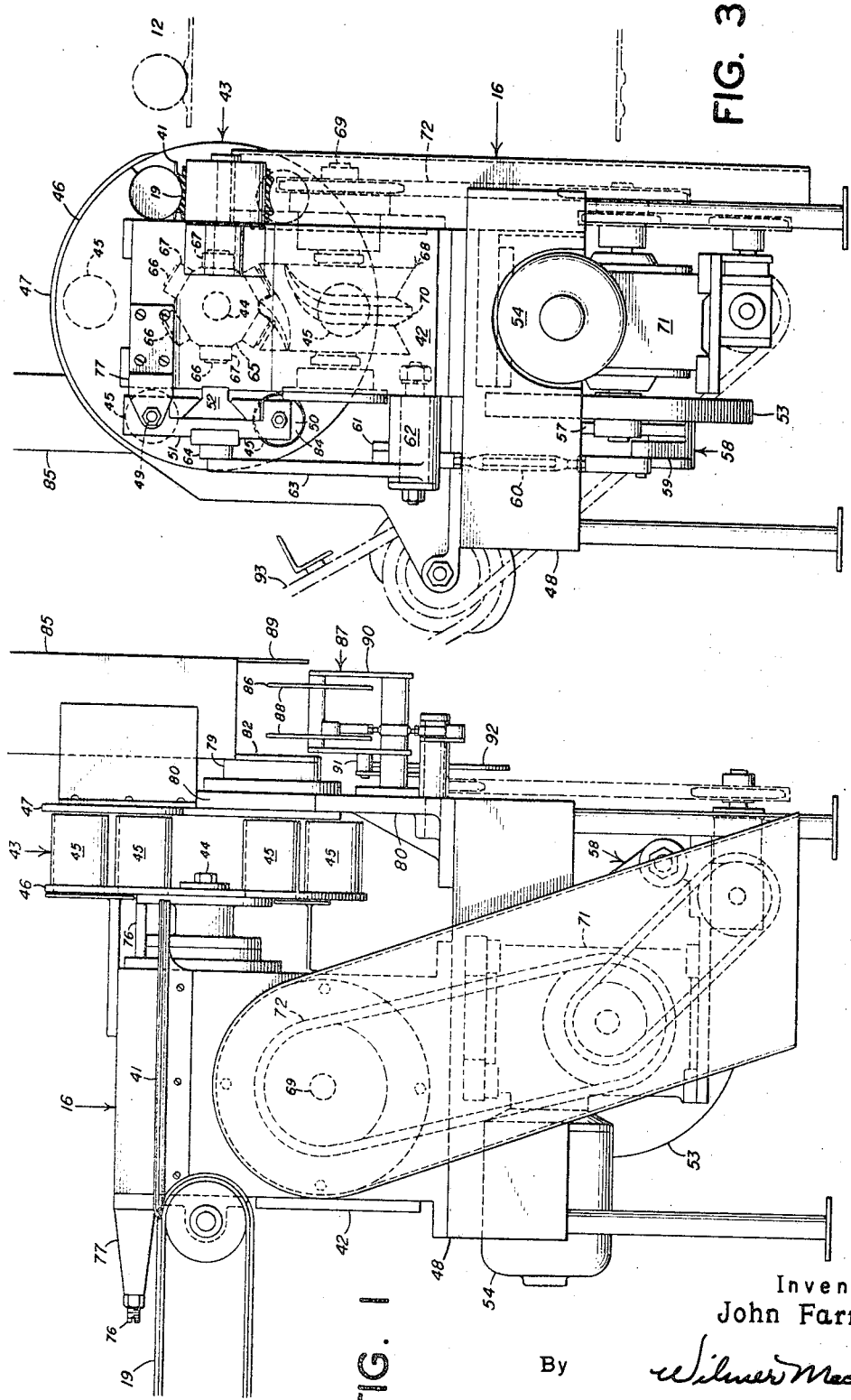

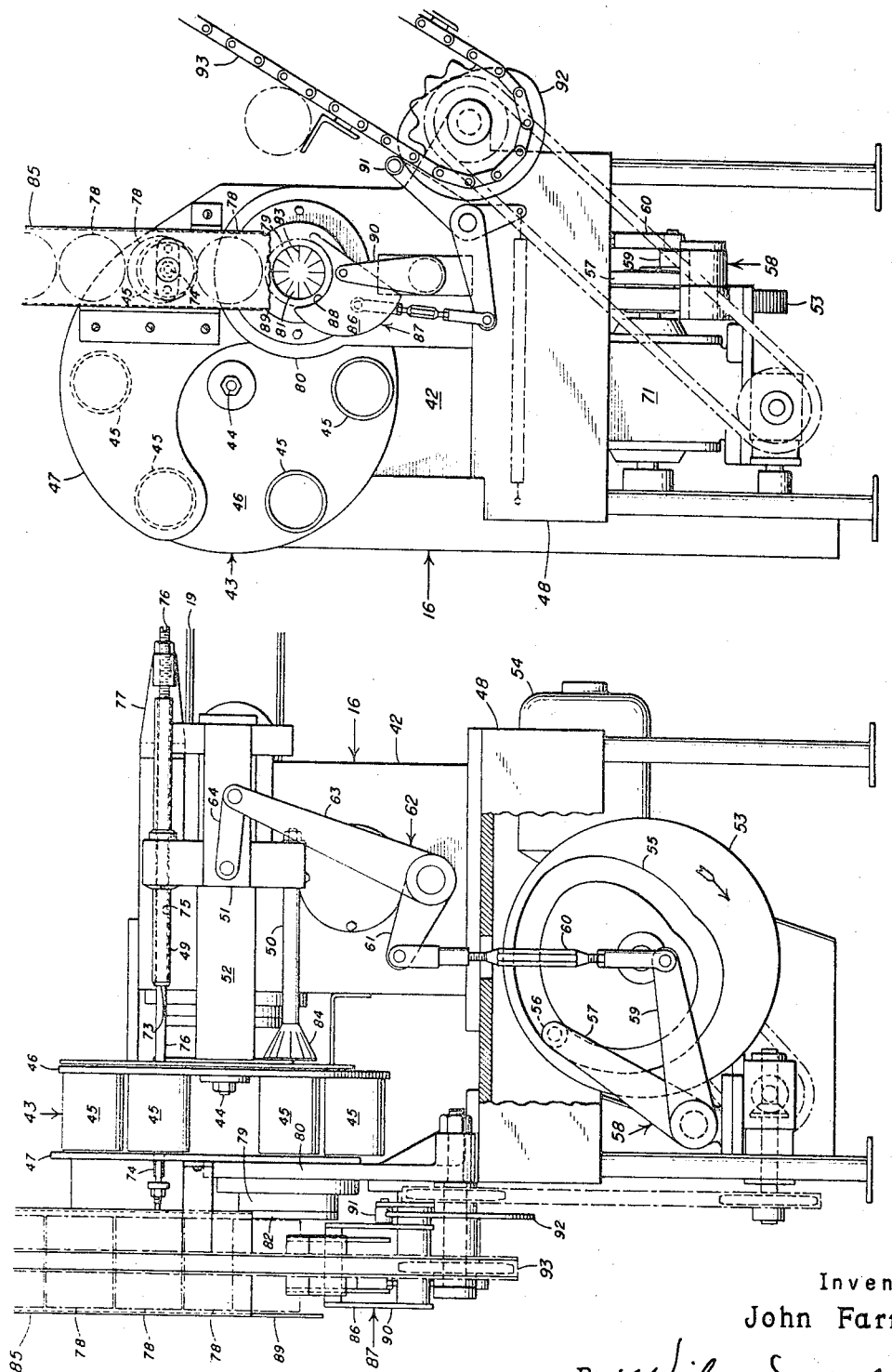

3,434,515
PINEAPPLE SLICE CORING AND
LOADING MACHINE
John Farmer, Honolulu, Hawaii, assignor to Honolulu
Iron Works Company, Honolulu, Hawaii, a corporation
of Hawaii
Original application Sept. 29, 1961, Ser. No. 141,680, now
Patent No. 3,246,678, dated Apr. 19, 1966. Divided and
this application Oct. 23, 1965, Ser. No. 502,857
Int. Cl. A23n 3/12; A47j 25/00; B65b 5/00
U.S. Cl. 146—6                                8 Claims

ABSTRACT OF THE DISCLOSURE

A machine for coring and canning pineapple slices combining an indexable multibarrelled turret with means for feeding uncored slices into a presented barrel, a coring tube and a pusher projectable into the barrel at sequential stops of the turret respectively for coring the slices and ejecting them from the barrel, and means for feeding empty cans to a position to receive the ejected slices.

This invention relates to a coring and can loading machine for coring pineapple slices and loading them into cans. This application is a division of my copending application Ser. No. 141,680, filed Sept. 29, 1961, now Patent No. 3,246,678.

While attempted somewhat earlier, the mass production of canned pineapples actually began around 1914 with the introduction of the Ginaca machine or "Ginaca," as it is sometimes called. Although improvement have been made in Ginaca from time to time, basically the same machine is in use in the pineapple canning industry today and invariably is used whenever pineapples are processed for producing the slices, chunks and tidbits of the solid pack. The lead machine in the conventional processing line, the Ginaca in one continuous operation sizes a pineapple by making a cylindrical cut to remove the shell and leave a fruit cylinder, cuts off the butt and crown at the ends of the cylinder, cuts out the core and finally discharges the cylinder for further processing. Conventionally, the further processing involves first inspection and hand trimming of the fruit cylinder to remove eyes, skin traces or other surface imperfections, followed by slicing of the cylinders into slices of predetermined thickness by a gang cutter which slices a pineapple in its entirety in a single sweep. Thereafter, the slices are inspected and sorted according to quality and those suitable for the fancy, choice and standard grades of the solid pack are loaded into cans, usually by hand. The remaining, so-called salvage slices, in their turn, are consigned to the less profitable crushed and juice packs.

A Ginaca is effective in sizing, end-cutting and coring a pineapple, but is one of the most expensive individual machines used by the entire fruit canning industry and the conventional process entails more hand work than does the industrial canning of any other kind of fruit. For lack of anything better, the conventional processing line has heretofore been employed in recovering fruit for the solid pack from larger pineapples, but the expensiveness of the facilities, to say nothing of that of the necessary labor, have practically barred its use in recovering solid pack fruit from small pineapples weighing less than 2½ lbs. Consequently, even though small fruit usually has the tenderest meat, generally can produce 1 T size slices and represents a substantial part of the yearly crop, it is now processed for the least profitable of the packs, the juice pack, with corresponding loss to the industry.

As opposed to the conventional process, it has now been found possible to process pineapples for the solid pack without using a Ginaca and so economically as to make it commercially practicable to recover meat for the solid pack from small as well as larger fruit. The new process is the invention described at length and claimed in the parent application, Ser. No. 141,680. The present invention is directed to a coring and can loading machine particularly suited for use in such a process.

An object of the invention is to provide a machine capable in its operating cycle of coring pineapple slices and loading the meat therefrom into cans, either as slices or as tidbits into which the slices are cut in the course of loading.

Another object of the invention is to provide apparatus for coring pineapple slices whereby, as desired, the cut cores may be removed from the slices or left in place, in the latter case enabling the cores to be included in the solid pack as a novelty item for various possible uses.

Other objects and advantages of the invention will appear hereinafter in the detailed description, be particularly pointed out in the appended claims and be illustrated in the accompanying drawings, in which:

FIGURE 1 is a side elevational view taken from one side of a preferred embodiment of the coring and can loading machine of this invention;

FIGURE 2 is an elevational view of the opposite side of the machine of FIGURE 1, with portions broken away and shown in section to more clearly illustrate certain of the details of construction;

FIGURE 3 is an elevational view of the feed end of the machine of FIGURE 1; and

FIGURE 4 is an elevational view of the discharge end of the machine of FIGURE 1.

Referring now in detail to the drawings in which like reference characters designate like parts, the improved coring and can loading machine of this invention is particularly designated for use in the process of my application Ser. No. 141,680.

Whether applied to small or larger pineapples, the essential steps in the process of application Ser. No. 141,680, in the sequence in which they are performed, are sizing, slicing and coring. The sizing operation of that invention is not the conventional sizing on a Ginaca machine followed in the machine's operating cycle by butt and crown or end cutting and by coring, but simply the making of a cylindrical cut to remove the shell and leave a fruit cylinder with its ends and core intact. The sizing operation may be and preferably is accompanied by eradication of the meat from the shell for use in the crushed and juice packs. However, even with this addition, the operation is readily performable on a machine that is much simpler and less expensive than a Ginaca machine and requires no complicated mechanism for feeding pineapples for sizing such as is necessitated by the Ginaca's cyclical operation. In turn, the slicing operation is not the conventional gang cutting of an end cut and cored fruit cylinder but the cutting of slices from a cylinder which at the time of cutting has its core and preferably also its butt and crown ends intact. The last of the essential steps, the coring, is performed on slices and, while in all cases the cores will be severed or cut from the surrounding ring of meat to form the familiar annular slices, the stage at which the fruit is cored enables the cores either to be removed or to be canned as a novelty item with the remaining meat.

As in the conventional process, it is contemplated in the process of application Ser. No. 141,680 to inspect the fruit undergoing treatment at different stages. At least three such inspections will usually be necessary, one, intermediate the sizing and slicing, to eliminate fruit that is wholly rotten or otherwise unusable, another, intermediate slicing and coring, to sort out the slices suitable for canning without further preparation other than coring, and the third, performed concurrently with or following the second, to sort from the remaining slices those having edible meat salvageable for the solid pack by resizing. In the handling incident to such inspections, as well as in the slicing, the intactness of the cores at these stages has the distinct advantage over the conventional process, in which the cores are removed at the outset, of preserving or retaining the relatively strong core structures for supporting the fruit, with consequent reduction in damage and breakage. The advantage is the greater, if the slices found in the second inspection to be suitable for canning without further preparation are cored as they are loaded into cans, thus preserving for this very substantial and usually larger part of the solid pack recovery the support of the cores during the entire preparation.

Capable of coring slices and loading them into cans either with or without their cores, the improved coring and can loading machine of the present invention particularly lends itself to use in the process of application Ser. No. 141,680 in both coring and loading slices requiring no further preparation. When so used, the improved machine, designated as 16, will receive for coring and loading suitable slices sorted from the output of a slicer, preferably such as disclosed in Farmer Patent No. 3,136,348, issued June 9, 1964. In such use, the coring and can loading machine 16 preferably is positioned along the processing line at a side of a main conveyor or feed belt 12 beyond a second inspection station 15 and has a feed belt 19 paralleling the main belt onto which the perfect slices are transferred directly from a sorting track (not shown). Formed or contoured to receive and support the slices upright or on edge, the feed belt 19 feeds the slices in that manner onto an aligned, correspondingly contoured accumulator or supply trough or shelf 41 fixed to a side of a housing 42 and leading to a multibarrelled turret 43. Rotatable on a substantially horizontal axis on a spindle or shaft 44 journalled in the same housing, the turret 43 has its open-ended barrels 45, here six, arranged uniformly about the axis of the spindle and may mount them between a pair of end discs. However, as in the illustrated embodiment, the multiplicity of barrels may be carried by a single face or front end disc or plate 46.

Suitably fixed or anchored to and opening forwardly through and projecting rearwardly from the face disc 46, each of the barrels 45, in one of the stops or dwells of the turret, aligns with and is adapted to receive slices from the accumulator trough 41. Conversely, during indexing, the turret confronts the trough with the blank or solid portions of its face disc intermediate the barrels. Consequently, while the machine is operating, each stop or dwell of the turret will present a barrel for loading at the loading position and an accumulation of slices sufficient to fill the accumulator trough 41 will enable the pressure or friction of the feed belt 19 on following or succeeding slices to push the slices at the discharge end of the trough into the presented barrel until the end slice abuts a stop or backing plate 47 fixed to and upstanding from the base 48 of the machine and covering or closing the rear end of the barrel in loading position. With each of its barrels so loaded, the turret during indexing uses its face disc 46 as a stop to hold back the remaining slices on the accumulator trough against the pressure of the belt. The capacity of the barrels 45 is the same as that of the cans into which the slices are to be loaded and each barrel as it moves in the indexing of the turret is adapted to present its load of slices first for coring and then for loading into cans.

In the preferred machine, the coring and can loading steps in its operating cycle are performed at sequential dwells of the turret. This is accomplished by mounting a coring tube 49 for coring the slices and a pusher or plunger 50 for discharging cored slices into cans in transversely spaced relation on a cross-head 51 slidably mounted on a slide or guide bar 52 fixed to a side of the housing 42 opposite that carrying the accumulator trough 41, with the spacing between the tube and pusher and their positions relative to the turret such that the pusher will act on the slices in one barrel as the tube acts on those in the next or succeeding barrel. Slicing horizontally on the slide bar 52, the crosshead 51 is reciprocated in synchronism with the indexing of the turret by a suitable drive, here in the form of a cam 53 driven off a motor 54 mounted in the base 48 and having a cam track 55 engaged by a roller 56 on one arm 57 of a bellcrank 58 pivoted to the base. The upper or other arm 59 of the bellcrank is connected through an adjustable linkage 60 to a lower arm 61 of a second bellcrank 62 pivoted to the housing 42 and having its opposite or upper arm 63 connected by a link 64 to the crosshead 51. Turning in the direction indicated by the arrow in FIGURE 14, the cam 53, as it turns, will advance or drive the crosshead 51 forwardly from the zero, at rest or retracted position shown in that figure toward the turret, this forward motion or advance stroke continuing until the coring tube 49 and pusher 50 have completed their operations, at which point, still under control of the cam, the crosshead begins its retract stroke, ultimately to return to its initial or at rest position.

The turret 43 in turn may be indexed by a geneva drive or an interrupted gear mechanism. However, because of the relatively long dwell and smooth acceleration and deceleration characteristics it is preferred to employ a Ferguson cam and roller gear drive. As indicated in FIGURE 15, the preferred drive has a hub 65 fixed to the spindle 44 and carrying a plurality of radially extending stub shafts 66 corresponding in their number and angular relation to the stops in the cycle of the turret and each mounting a roller follower 67. For turning the hub 65 and therethrough the spindle 44, there is provided a cam 68 mounted on an axle or shaft 69 disposed at right angles or normal to the spindle and having a central circumferential cam rib 70 which generally is straight but is interrupted at one point in its periphery with its ends at opposite sides of the interruption or break turned or curved oppositely toward opposite faces of the cam. The rib 70, during the greater part of a full rotation of the cam, presents its intermediate straight part for engagement and straddling by a pair of adjoining followers 67, which, as they are approached by the break in the rib, follow the turn in the rib's adjoining end, in process disengaging one of the followers from the rib and engaging the other follower and the adjoining follower on its other side with the rib's opposite end.

The successive disengagement and engagement of pairs of followers 67 with the ends of the rib 70, by forcing the hub 65 to turn through the angle or arc between adjoining followers, indexes the turret 43 between stops, while the succeeding engagement of the straight intermediate portion of the rib by a pair of followers holds the turret against rotation in one of its stops or dwells. It is, of course, necessary that the indexing of the turret and the strokes of the crosshead 51 be synchronized so that the crosshead will advance only when the turret is at one of its stops, this here being accomplished by driving the crosshead cam 53 off the motor 54 by suitable reduction gearing 71 and drivably connecting the indexing cam 68 to the crosshead cam 53 by a chain and sprocket drive 72.

Driven in the above manner in synchronism with indexing of the turret 43, the coring tube 49 cores the slices in one of the barrels 45 at one stop of the turret and at the next stop the pusher 50 acts to push or eject the cored slices from the barrel. To ensure that the cutting end 73 of the coring tube will not be clogged by cores from a preceding coring as it enters a particular barrel, the coring tube is so mounted on the crosshead 51 as to project through and somewhat beyond the rear end of the presented barrel on completion of its advance stroke and there is mounted on the fixed backing plate 47 an axially adjustable thrust pin 74 aligned axially with the coring tube and adapted to be received by or enter into the cutting end of the tube as the latter completes a coring operation. If the coring tube 49 has its bore 75 open except for cores as its cutting end 73 receives the thrust pin 74, the action of the thrust pin, in pushing back the cores to unclog that end of the tube, will complete the action initiated during the particular coring operation of ejecting a full load of cores from the tube's opposite end. In such case, the thrust rod 76 shown in FIGURE 14 as slidably received by and extending through the bore 75 of the coring tube 49 to the face plate 46 of the turret 43, will have been removed to clear the bore. The purpose of this thrust rod 76 is to enable cores to be cut from the slices in the presented barrel without disturbing their position in the slices, so that the cores can be loaded with the slices as a novelty item. If this, rather than removal of the cores, is the result desired, the thrust rod, conveniently mounted for axial adjustment on a bracket 77 fixed to the housing 42, will be positioned as shown in FIGURE 14.

With the coring operation cutting the cores from the slices and, as desired, either removing them or leaving them in place, the batch of cored slices in the particular barrel 45 is subjected at the next stop of the turret to the action of the pusher 50 and pushed, ejected or discharged thereby from the turret into an empty can 78 open at one end and held at that time in alignment with the barrel with its open end confronting the barrel's rear end. If the slices are to be canned as such, the stroke or the pusher will be so regulated as to push the batch from the barrel through the backing plate 47 directly into the can. Should it be so desired, instead, to load the slices as tidbits, this can be accomplished by interposing between the backing plate and the empty can a cutter head 79 mounted on the backing plate or, more suitably, on a support bracket or plate 77 therefor rigid with the base 48 and having a throat or bore 81 of the diameter of and aligned with the presented barrel and carrying, conveniently on a detachable ring 82, a plurality of circumferentially spaced cutters 83 instanding radially into the throat to the depth of the slices. With the head 84 of the pusher 50 radially slotted in correspondence with the cutters 83 so as to pass therethrough, the pusher is adapted, by correspondingly regulating its axial movement relative to the turret, to push the batch through both the barrel and the cutter head into the presented empty can and, by replacing the removable cutter-carrying ring 82 by a plain ring, the cutter head can be left in place when it is desired to load the slices as such.

In order to have an empty can presented for loading at the barrel aligned with the pusher 50 at each stop of the turret 43, provision is required for feeding empty cans to loading position, as well as for holding them in that position during loading and subsequently ejecting the loaded cans onto a disc, elevator or other suitable conveyor for distribution to a can closing machine. The illustrated machine makes such provision by an arrangement somewhat similar to that employed in the can loading machine shown in my Patent No. 3,136,103, issued June 9, 1964. As in that patent, the empty cans 78 are fed by gravity to loading position by a feed chute 85 fixed to and upstanding from the backing plate 47, each as it reaches the bottom of the chute being first held therein by engagement with the convexly curved back 86 of an oscillatable can shifter 87 and then, as the shifter oscillates, dropping into a pocket 88 in the shifter in which the can is held during loading, the can at this stage being backed by a stop or supplemental backing plate 89 conveniently formed integrally with and depending from the outer side of the chute. Itself pivotally mounted on a support arm 90 fixed to the support bracket 80 and controlled in its oscillations by the engagement of a connected spring-urged follower 91 with a cam 92 synchronized in drive with the turret 43 and crosshead 51, conveniently by being driven off the same motor 54, the can shifter 87, on completion of the loading operation, ejects the loaded can onto a suitable conveyor, here in the form of a flighted chain elevator 93, also driven off the same motor for distribution to the closing machine (not shown).

From the above detailed description it will be apparent that there has been provided a coring and can loading machine which not only can core slices as it loads them into cans, but by coring the slices at that stage, permits them to be strengthened by their cores in earlier stages, with consequent reduction in breakage. It should be understood that the described and disclosed embodiment is merely exemplary of the invention and that all modifications are intended to be included that do not depart from the spirit of the invention and the scope of the appended claims.

Having described my invention, I claim:

1. A machine for coring and loading pineapple slices into cans comprising an indexing multibarrelled turret mounted on a frame for rotation about a substantially horizontal axis, means for feeding pineapple slices with cores intact into barrels of said turret at one stop thereof, a coring tube, a pusher transversely spaced from said coring tube, said coring tube and pusher being mounted on said frame for reciprocation parallel to the rotative axis of said turret and each aligning with a barrel at a stop of said turret for sequentially coring a batch of slices and ejecting said batch from said turret, and means for feeding empty cans to a loading position for receiving the batches of slices discharged from said turret by said pusher.

2. A machine for coring and loading pineapple slices into cans comprising an indexable multibarrelled turret mounted on a frame for rotation about a substantially horizontal axis, means for feeding pineapple slices with cores intact into barrels of said turret at one stop thereof, a coring tube, a pusher transversely spaced from said coring tube, said coring tube and pusher being mounted on said frame for reciprocation parallel to the rotative axis of said turret and each aligning with a barrel at a stop of said turret for sequentially coring a batch of slices and ejecting said batch from said turret, means for feeding empty cans to a loading position for receiving the batches of slices discharged from said turret by said pusher, means for indexing said turret, and means for operating said coring tube, pusher and can feeding means in timed relation to the indexing of said turret.

3. A machine for coring and loading pineapple slices into cans comprising an indexable multibarrelled turret mounted on a frame for rotation about a substantially horizontal axis, means for feeding pineapple slices with cores intact into the barrels of said turret at one stop thereof, a coring tube, a pusher transversely spaced from said coring tube, said coring tube and pusher being mounted on said frame for reciprocation parallel to the rotative axis of said turret and each aligning with a barrel at a stop of said turret for sequentially coring a batch of slices and ejecting said batch from said turret, means for sequentially feeding empty cans to a loading position in alignment with said pusher each for loading thereby with a batch of slices from one of said barrels, and a common motor drivably connected to said turret, coring tube, pusher and can feeding means for indexing said turret and operating said coring tube, pusher and can feeding means in timed relation to said indexing.

4. A machine for coring pineapple slices and loading meat therefrom into cans comprising an indexing multibarrelled turret rotatable about a substantially horizontal axis, a feed belt for supporting pineapple slices upright and by friction on succeeding slices positively forcing a batch of slices into each barrel of said turret at a stop thereof, a coring tube, a pusher transversely spaced from said coring tube, said coring tube and pusher extending and being reciprocable substantially parallel to the rotative axis of said turret and each aligning in a stop thereof with one of said barrels for sequentially coring and ejecting a batch of slices from a barrel, means for sequentially feeding empty cans to a loading position in alignment with said pusher for loading of each by said pusher with a batch ejected thereby from one of said barrels, and a fixed thrust rod extending through said coring tube substantially to a front face of said turret for holding in position in the slices of each batch the cores cut therefrom by said coring tube.

5. A machine for coring pineapple slices and loading meat therefrom into cans comprising an indexable multi-barrelled turret mounted on a housing for rotation about a substantially horizontal axis, a feed belt for supporting pineapple slices upright and by friction on succeeding slices positively forcing a batch of slices into each barrel of said turret at a stop thereof, a crosshead slidably mounted on a slide bar fixed to said housing for reciprocation parallel to the rotative axis of said turret, a coring tube and pusher mounted in transversely spaced relation on said crosshead and each disposed parallel to said rotative axis, said coring tube and pusher aligning with a barrel of said turret at successive stops thereof for sequentially coring a batch in and pushing said batch from one of said barrels, means for successively feeding empty cans to a loading position in axial alignment with said pusher for loading thereby with a batch from one of said barrels, and means for indexing said turret and operating said coring tube, pusher and can feeding means in timed relation to said indexing.

6. A machine for coring pineapple slices and loading meat therefrom into cans comprising an indexable multi-barrelled turret mounted on a housing for rotation about a substantially horizontal axis, a feed belt for supporting pineapple slices upright and by friction on succeeding slices positively forcing a batch of slices into each barrel of said turret at a stop thereof, a crosshead slidably mounted on a slide bar fixed to said housing for reciprocation parallel to the rotative axis of said turret, a coring tube and pusher mounted in transversely spaced relation on said crosshead and each disposed parallel to said rotative axis, said coring tube and pusher aligning with a barrel of said turret at successive stops thereof for sequentially coring a batch in and pushing said batch from one of said barrels, means for successively feeding empty cans to a loading position in axial alignment with said pusher for loading thereby with a batch from one of said barrels, means for indexing said turret and operating said coring tube, pusher and can feeding means in timed relation to said indexing, and a thrust rod mounted for axial adjustment on said housing and extending through said coring tube substantially to the front end of said turret for holding in position in the slices of each batch the cores cut therefrom by said coring tube.

7. A machine for coring pineapple slices and loading meat therefrom into cans comprising an indexable multi-barrelled turret mounted on a housing for rotation about a substantially horizontal axis, a feed belt for supporting pineapple slices upright and by friction on succeeding slices positively forcing a batch of slices into each barrel of said turret at a stop thereof, a crosshead slidably mounted on a slide bar fixed to said housing for reciprocation parallel to the rotative axis of said turret, a coring tube and pusher mounted in transversely spaced relation on said crosshead and each disposed parallel to said rotative axis, said coring tube and pusher aligning with a barrel of said turret at successive stops thereof for sequentially coring a batch in and pushing said batch from one of said barrels, means for successively feeding empty cans to a loading position in axial alignment with said pusher for loading thereby with a batch from one of said barrels, means for indexing said turret and operating said coring tube, pusher and can feeding means in timed relation to said indexing, and a cutter head interposed between a rear end of said turret and a can in said loading position for radially cutting the slices of each batch into tidbits as the batch is pushed from a barrel into a can.

8. A machine for coring pineapple slices and loading meat therefrom into cans comprising an indexing multi-barrelled turret rotatable about a substantially horizontal axis, a feed belt for supporting pineapple slices upright and by friction on succeeding slices positively forcing a batch of slices into each barrel of said turret at a stop thereof, a coring tube, a pusher transversely spaced from said coring tube, said coring tube and pusher extending and being reciprocable substantially parallel to the rotative axis of said turret and each aligning in a stop thereof with one of said barrels for sequentially coring and ejecting a batch of slices from a barrel, means for sequentially feeding empty cans to a loading position in alignment with said pusher for loading of each by said pusher with a batch ejected thereby from one of said barrels, and means for holding in position in the slices of each batch the cores cut therefrom by said coring tube.

References Cited

UNITED STATES PATENTS

| 1,112,130 | 9/1914 | Ginaca | 146—6 |
| 1,892,685 | 1/1933 | Shoji | 53—123 |
| 2,092,773 | 9/1937 | Nordquist et al. | 146—6 X |
| 2,092,786 | 9/1937 | Taylor | 53—23 |

W. GRAYDON ABERCROMBIE, *Primary Examiner.*

U.S. Cl. X.R.

53—123; 146—52